United States Patent [19]
Kikuchi

[11] Patent Number: 5,199,539
[45] Date of Patent: Apr. 6, 1993

[54] FLUID COUPLING HAVING A VANE PUMP SYSTEM

[75] Inventor: Yasuhei Kikuchi, Shizuoka, Japan

[73] Assignee: Usui Kokusai Sangyo Kaisha Ltd., Shizuoka, Japan

[21] Appl. No.: 690,695

[22] Filed: Apr. 24, 1991

[30] Foreign Application Priority Data

Apr. 27, 1990 [JP] Japan .................. 2-110551

[51] Int. Cl.⁵ .................................... F16D 31/02
[52] U.S. Cl. .................................... 192/60; 192/82 T; 123/41.12
[58] Field of Search .......... 192/58 R, 60, 82 T; 123/41.12; 416/169 A; 417/292; 464/24, 27

[56] References Cited

U.S. PATENT DOCUMENTS

| | | | |
|---|---|---|---|
| 3,093,983 | 6/1963 | Montgomerie | 123/41.12 X |
| 3,211,136 | 10/1965 | Burckhardt et al. | 123/41.12 |
| 4,188,785 | 2/1980 | Ando et al. | 192/82 T X |
| 4,214,652 | 7/1980 | Quenneville | 192/58 R |
| 4,606,445 | 8/1986 | Rockey | 192/58 B |
| 4,662,495 | 5/1987 | Brunken | 192/58 B |
| 4,718,378 | 1/1988 | Child | 123/41.12 |
| 4,913,102 | 4/1990 | Ohmura et al. | 123/41.12 |
| 4,971,525 | 11/1990 | Nakayoshi et al. | 123/41.12 X |

FOREIGN PATENT DOCUMENTS

372515  11/1963  Switzerland .............. 192/82 T

*Primary Examiner*—Richard M. Lorence
*Attorney, Agent, or Firm*—Wenderoth, Lind & Ponack

[57] ABSTRACT

A temperature-controlled fluid coupling for intermittently driving a cooling fan of an internal combustion engine. The coupling comprises a drive input shaft having a rotor thereon, a housing for supporting a cooling fan, a plurality of radial vanes accommodated within the rotor, and a valve member within the housing. The vanes are movable in radial directions within an elliptic chamber in the housing. The rotor and the vanes provide a kind of vane pump system. A temperature sensitive element is disposed outside of the housing and connected to the valve member. The element operates to open and close the valve in response to a change of ambient temperature. The fan rotates to cool the engine only when the temperature goes up to a predetermined level.

15 Claims, 5 Drawing Sheets

FLUID COUPLING HAVING A VANE PUMP SYSTEM

BACKGROUND OF THE INVENTION

This invention relates to a temperature-controlled fluid coupling for intermittently driving a cooling fan attached to an automotive engine or similar equipment.

U.S. Pat. No. 4,606,445 (Rockey) discloses a typical design of a temperature-controlled fluid friction coupling According to this design, a housing is rotatably supported on a drive input shaft adapted to connect with an internal combustion engine. The interior space of the housing is separated by a partition into a fluid reservoir chamber and a fluid operating chamber. On the drive input shaft, a rotor is fixed so as to form mutually opposite shearing gaps between the housing and the rotor. A cooling fan is mounted on the housing. To the outer surface of the housing, is mounted a temperature-sensitive element made of a bimetallic coil which curves in response to a change of ambient temperature. In the partition, a valve opening is provided which is opened and closed by a valve arm connected to the bimetallic coil. As the bimetallic coil is deformed by a change of the ambient temperature, the valve arm is operated to open or close the valve opening. Then, viscous fluid flows into or out of the shearing gaps to effect or break a torque transmitting performance.

U.S. Pat. No. 4,662,495 (Brunken) discloses a similar fluid friction coupling in which a bimetallic plate is used.

In those types utilizing viscous resistance between the shearing gaps, silicone oil is generally charged within the housing. However, silicone oil has a disadvantage that its viscosity varies depending upon its temperature. This results in a lack of stability for performance, and a degradation of oil.

In conventional fluid friction couplings, it is almost impossible to utilize air and inactive gas for charging fluid within the housing.

SUMMARY OF THE INVENTION

It is an object of the present invention to provide an improved fluid coupling which enables the use of air and inactive gas instead of conventional viscous fluid.

Another object of the present invention is to reduce the weight of the coupling by utilizing air and inactive gas instead of conventional heavy fluid.

According to the present invention, there is provided a temperature-controlled fluid coupling for intermittently driving a cooling fan without utilizing viscous liquid. This coupling comprises a drive input shaft having a rotor thereon, a housing for supporting a cooling fan, a plurality of radial vanes accommodated within the rotor, and a valve member within the housing. The vanes are movable in radial directions within an actuating chamber in the housing. The rotor and the vanes provide a kind of vane pump system.

A temperature-sensitive element is disposed outside of the housing and connected to the valve member. The element operates to open and close the valve in response to a change of ambient temperature.

Within the housing, air or inactive gas is charged. Conventional shearing gaps are not arranged within the housing.

As the rotors rotate in the actuating chamber, the radial vanes rake out the fluid and direct it toward the valve member. When the valve is in its OPEN position, the fluid can pass through the valve and return to the actuating chamber, whereby the vanes and the rotor can continue free rotation within the housing. Since the rotor is connected to the drive input shaft, the housing is not driven by the drive input shaft. The fan is kept in an OFF condition.

When the valve is turned to its CLOSED position, the fluid cannot pass through the valve. Since the vanes cannot rake out the fluid, they are fixed in the actuating chamber. Then, the rotor begins to turn the housing which carries the fan. Thus, the fan is turned into an ON condition.

OPEN and CLOSED positions of the valve are controlled by the temperature-sensitive element. This element is preferably formed into a bimetallic coil or rectangular bimetallic plate.

Embodiments of the invention will now be described by way of example with reference to the drawings, in which like reference numerals refer to like elements in the several views.

DESCRIPTION OF THE PREFERRED EMBODIMENT

Figure 1:
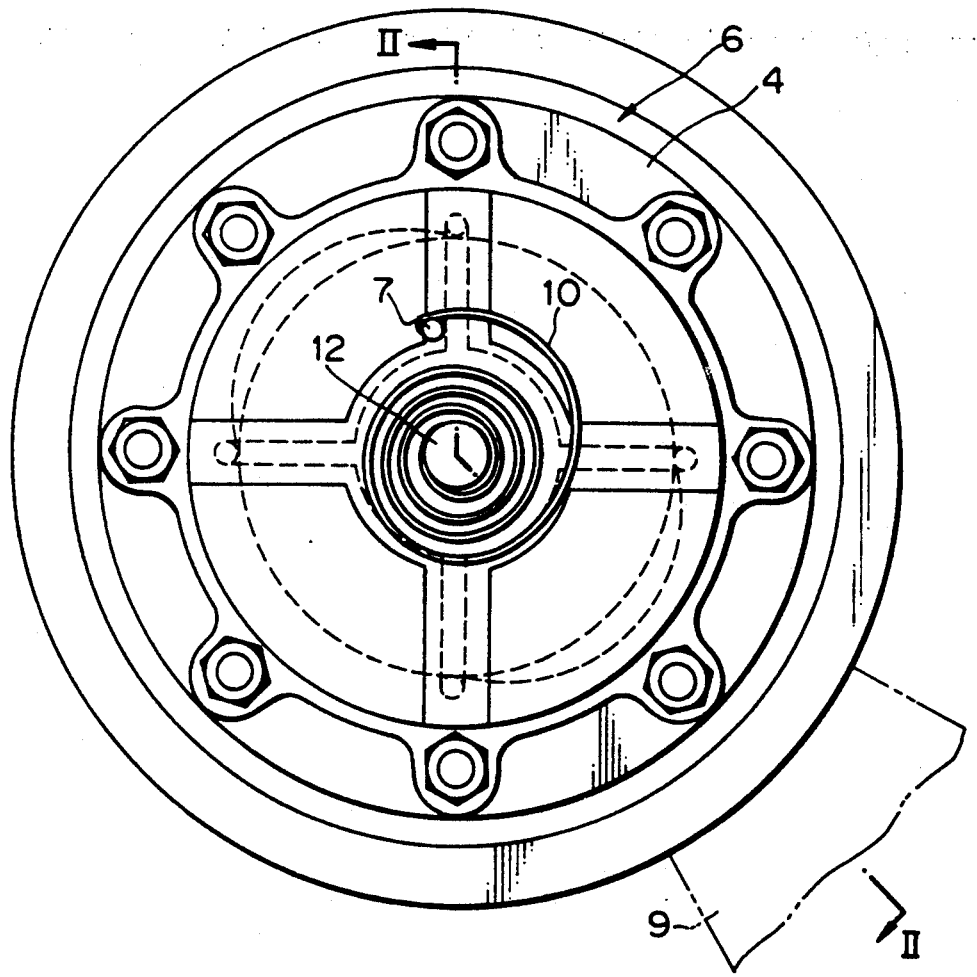
FIG. 1 is a front elevational view of a fluid coupling according to the present invention.
Figure 2:
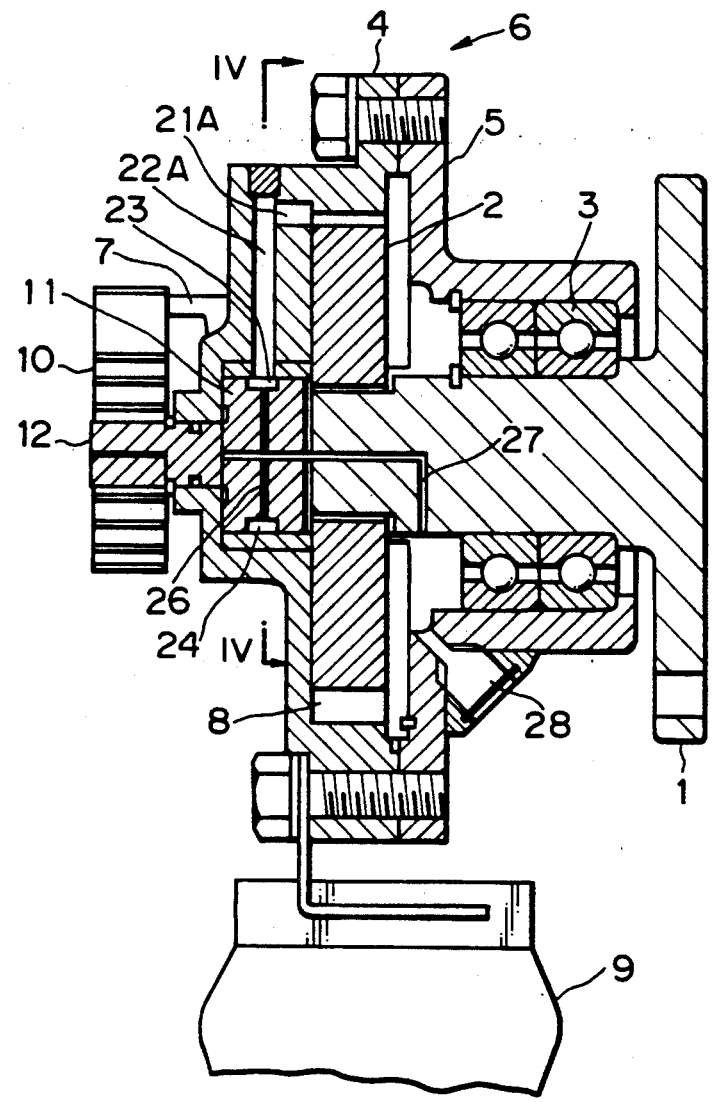
FIG. 2 is a vertical sectional view taken along the line II—II in FIG. 1.

Referring to FIGS. 1 to 5, there is shown a preferred embodiment of a fluid coupling according to the present invention. In FIGS. 1 and 2, only one fan blade 9 is illustrated. Other fan blades are omitted for illustrative simplification.

A drive input shaft 1 can be connected to an output shaft of an engine by way of joint flanges. Near the inner end of the drive shaft 1, a disk rotor 2 is fixed by means of a spline. On the central portion of the shaft 1, a housing 6 is rotatably supported by means of bearings 3, which are preferably provided with seal members. The housing 6 comprises a front cover 4 which carries a plurality of fan blades 9, and an associated rear body 5. To the outer surface of the front cover 4, is mounted a temperature-sensitive element 10 made of a bimetallic coil. Inside of the cover 4, a cylindrical valve member 11 is disposed.

The outer end of the bimetallic coil 10 is fixed to a lug portion 7 which projects from the surface of the cover 4. The inner end of the bimetallic coil 10 is secured to a shaft 12 which extends from the valve member 11. When the bimetallic coil 10 is curved toward circumferential directions in response to a change of ambient temperature, the shaft 12 is turned, whereby the valve member 11 is also turned. This rotation of the valve member 11 provides opening and closing operation of the valve.

Figure 3:
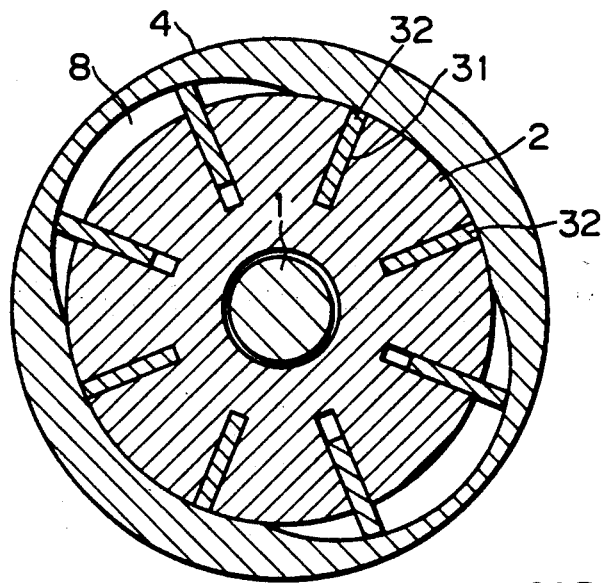
FIG. 3 is a partial sectional view illustrating a rotor and radial vanes.

The rotor 2 is accommodated within an actuating chamber 8 formed in the housing 6. As shown in FIG. 3, inside of the rotor 2, eight radial slots 31 are arranged circumferentially with equal distances therebetween. Within each slot 31, a disk vane 32 is slidably accommodated such that it can move in radial directions. The interior wall of the actuating chamber 8 is formed in a kind of elliptic configuration. It should be noted that these arrangements of the rotor 2 and the vanes 32 are similar to those of a vane pump.

In FIG. 2, an axial port 21A is located adjacent the actuating chamber 8 for providing a fluid communication therethrough. The axial port 21A leads to a radial passage 22A, which extends to a peripheral cavity 23 formed on a periphery of the cylindrical valve member 11. On the outer surface of the rear body 5, a breathing hole 28 is located.

Figure 5:
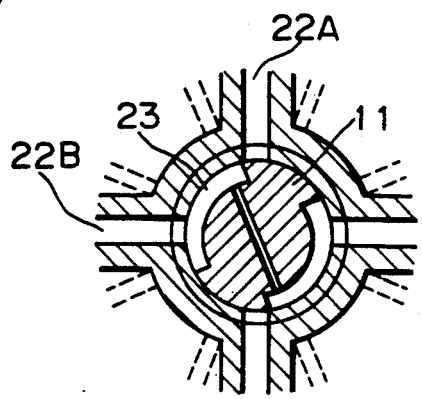
FIG. 5 is a partial sectional view showing a CLOSED position of the valve.
Figure 4:
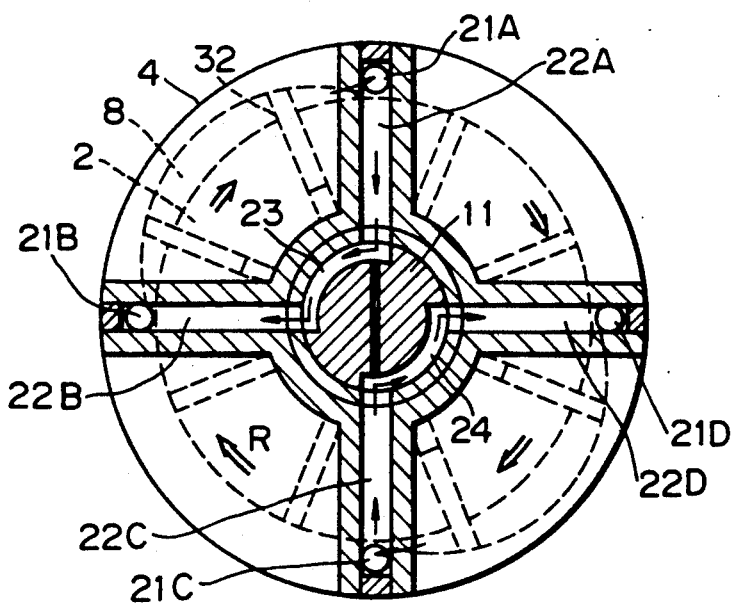
FIG. 4 is a vertical sectional view taken along the line IV—IV in FIG. 2, showing an OPEN position of the valve.

FIGS. 4 and 5 illustrate a changing operation of fluid communication between the radial passages within the housing and the peripheral cavities on the valve member. As shown in FIG. 4, four axial ports 21A, 21B, 21C, 21D and four radial passages 22A, 22B, 22C, 22D are prepared for fluid communications.

FIG. 4 shows an OFF condition of the fluid coupling under low ambient temperature in which a fan cooling performance is not required. The valve member 11 is kept in the illustrated OPEN position. When the rotor 2 is driven by an engine and rotated toward the direction R, the fluid in the chamber 8 is raked off by the radial vanes 32 and circulated within the housing 6 through the fluid passages and the valve member 11.

The raked off fluid from one side of the chamber 8 passes through the axial port 21A, radial passage 22A, peripheral cavity 23, radial passage 22B, and axial port 21B. Then, it comes back to the chamber 8. Raked off fluid from another side of the chamber 8 passes through the axial port 21C, radial passage 22C, peripheral cavity 24, radial passage 22D, and axial port 21D. Then, it comes back to the chamber 8.

During the circulation flow, the fluid does not meet with a great resistance, so that the rotor 2 can freely rotate within the chamber 8. The driving power from the engine is not transmitted to the housing 6 which supports the fan 9. Thus, the fan 9 is kept in its OFF condition, only being turned slowly by a friction force transmitted by the bearings 3.

When ambient temperature goes up, the bimetallic coil 10 curves in a circumferential direction causing the valve member 11 to turn toward the same direction. When the valve member 11 turns to the position shown in FIG. 5, fluid communication between the radial passage 22A and the peripheral cavity 23 is cut off. Simultaneously, fluid communication between the radial passage 22C and the peripheral cavity 24 is cut off. Thus, the fluid in the chamber 8 has lost its way to flow out of the chamber. Only a small quantity of fluid can flow through clearance gaps and bypass holes 26, 27. However, in flowing through the narrow passages, the fluid meets with great resistance. Thus, the rotor 2 is nearly fixed in the chamber 8 causing the housing 6 to turn toward the same direction as the rotation of the engine. Thus, the coupling is changed into its ON condition, whereby the fan 9 begins to rotate at a high speed for cooling the engine.

During the time of transition from the OFF condition of FIG. 4 to the ON condition of FIG. 5, the communication area of the passage is gradually reduced, whereby the resistance against the flow of the fluid gradually goes up. Accordingly, the rotation speed of the fan also goes up by degrees (i.e. gradually).

FIGS. 6 to 9 show a second embodiment of the present invention. In this embodiment, a plate-type bimetallic element 70 and an associated piston-type valve member (or valve piston) 73 are used for changing operation of the fluid flow passages.

Figures 6, 7:
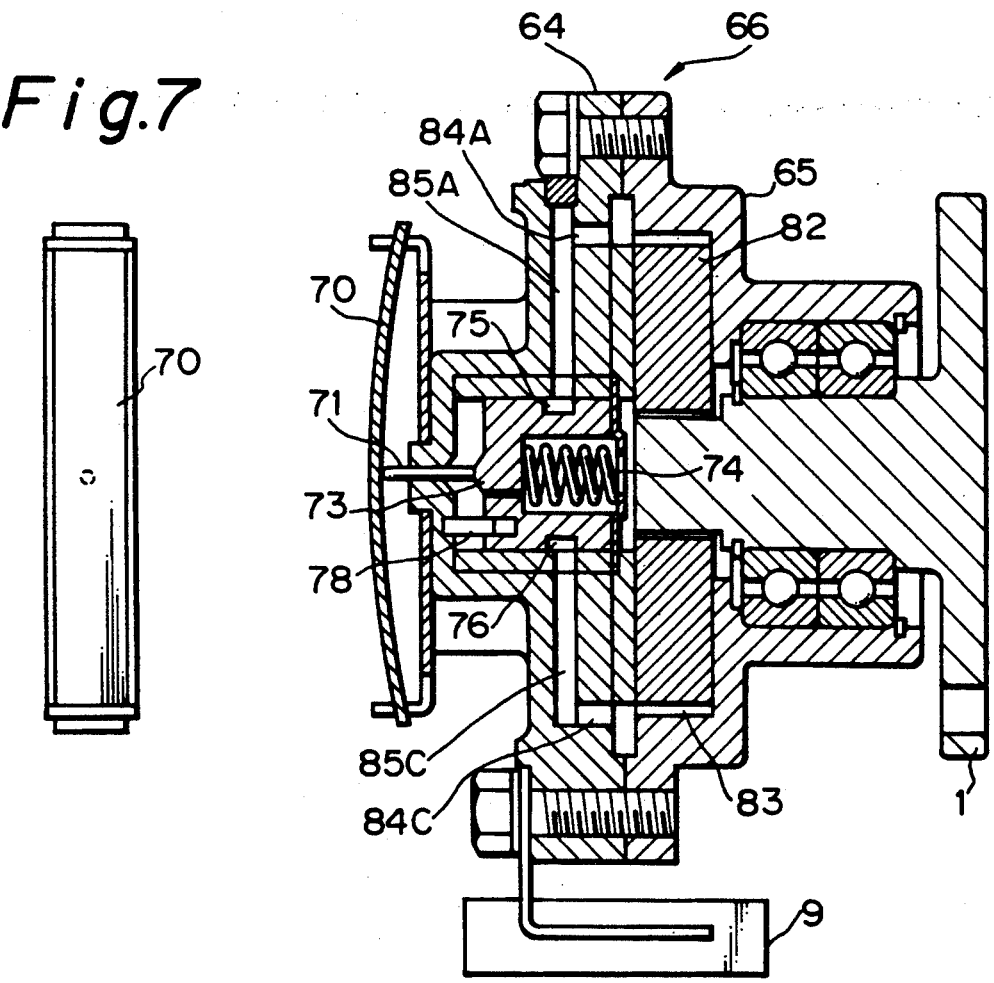
FIG. 6 is a vertical sectional view of a second embodiment of the invention.
FIG. 7 is a front view of a plate-type bimetallic element in FIG. 6.

In FIG. 6, the housing 66 comprises a front cover 64 which carries a plurality of fan blades 9, and an associated rear body 65. To the outer surface of the front cover 64, is mounted the rectangular plate-type bimetallic element (bimetal) 70. To the reverse side of the bimetal 70, a front end of an actuating pin 71 is kept in a contact relation therewith. The rear end of the pin 71 is also kept in contact relation with the piston-type valve member 73 so as to transmit a deformation of the bimetal 70 to the valve piston 73. Within the valve piston 73, a return spring 74 is disposed for biasing the piston 73 towards the bimetal 70. Inside of the cover 64, a retainer pin 78 is fixed. The other end of the pin 78 is slidably inserted into the valve piston 73. This pin 78 prevents the valve piston 73 from rotating.

In FIG. 6, the valve piston 73 is held at a right end position, which results in an OFF condition of the fluid coupling. The fan 9 is only turned at a considerably low speed by a friction force.

Figure 8:
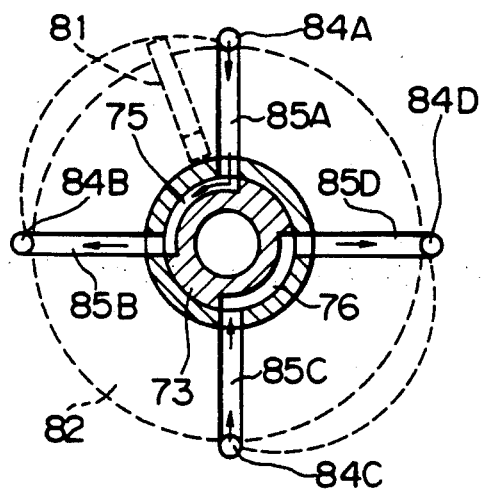
FIG. 8 is a vertical sectional view similar to FIG. 4, showing an OPEN position of the valve.
Figure 9:
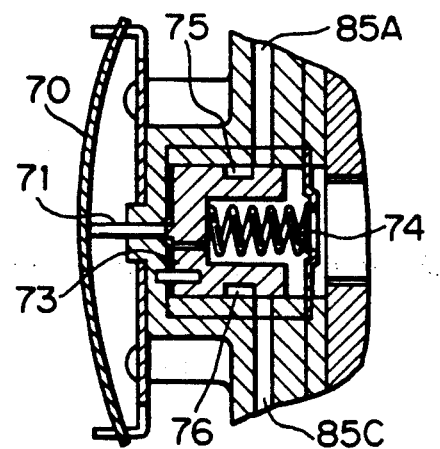
FIG. 9 is a partial sectional view showing a CLOSED position of the valve in FIG. 8.

On the other hand, in FIG. 9, the valve piston 73 is held at a left end position, which results in an ON condition of the fluid coupling. It should be noted that the curvature of the bimetal 70 varies from FIG. 6 to FIG. 9.

As shown in FIGS. 6 and 8, inside of the housing 66, a disk rotor 82 and a plurality of radial vanes 81 are accommodated in the same manner as in the first embodiment. For accommodating the rotor 82 and the vanes 81, an actuating chamber 83 is made in the same configuration as the chamber 8 in FIG. 3. Adjacent the actuating chamber 83, axial ports 84A, 84B, 84C, 84D are located for providing fluid communications therethrough.

The axial ports 84A, 84B lead to radial passages 85A, 85B, respectively. These passages 85A, 85B extend to a peripheral cavity 75 formed on a periphery of the valve piston 73. Similarly, axial ports 84C, 84D lead to radial passages 85C, 85D, respectively. These passages 85C, 85D extend to a peripheral cavity 76 formed on a periphery of the valve piston 73.

FIG. 6 shows an OFF condition of the fluid coupling under low ambient temperature in which fan cooling performance is not required. The valve member 73 is kept in the illustrated OPEN position. When the rotor 82 is driven by an engine such that it is rotated in the same direction as depicted by R in FIG. 4, the fluid in the chamber 83 is raked off by the radial vanes 81 and circulated within the housing 66 through the fluid passages and the valve piston 73.

The raked off fluid from one side of the chamber 83 passes through the axial port 84A, radial passage 85A, peripheral cavity 75, radial passage 85B, and axial port 84B. Then, it comes back to the chamber 83. Fluid raked off from another side of the chamber 83 passes through the axial port 84C, radial passage 85C, peripheral cavity 76, radial passage 85D, and axial port 84D. Then, it comes back to the chamber 83.

During the circulation flow, the fluid does not meet with a great resistance, so that the rotor 82 can freely rotate within the chamber 83. The driving power from the engine is not transmitted to the housing 66 which supports the fan 9. Thus, the fan 9 is kept in its OFF condition, only being turned slowly by a friction force transmitted by the bearings.

When the ambient temperature goes up, the bimetal 70 bends toward the left direction causing the valve piston 73 to move toward the left direction under the biasing force of the return spring 74. When the valve piston 73 moves to the position shown in FIG. 9, fluid communication between the radial passage 85A and the peripheral cavity 75 is cut off. Simultaneously, fluid communication between the radial passage 85C and the peripheral cavity 76 is cut off. Thus, the fluid in the chamber 83 has lost its way to flow out of the chamber. Only a small quantity of fluid can flow through clearance gaps. However, fluid which does flow through the narrow gaps meets with great resistance. Then, the rotor 82 is nearly fixed in the chamber 83 causing the housing 66 to turn toward the same direction as the rotation of the engine. Thus, the coupling is changed into its ON condition, whereby the fan 9 begins to rotate at a high speed for cooling the engine.

During a time of transition from the OFF condition of FIG. 6 to the ON condition of FIG. 9, the communication area of the passage is gradually reduced, whereby the resistance against the flow of fluid gradually goes up. Accordingly, the rotation speed of the fan 9 also goes up by degrees (i.e. gradually).

Figure 10:
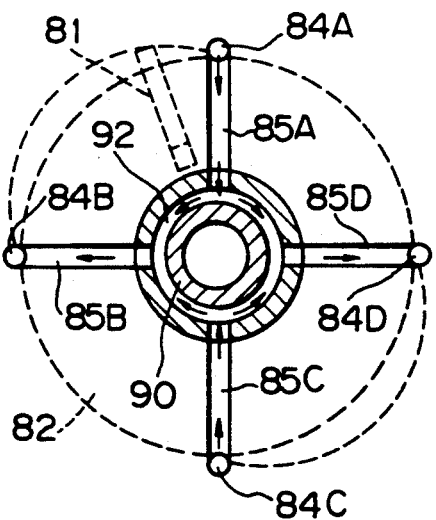
FIG. 10 is a vertical sectional view similar to FIG. 8, showing a modified valve member in its OPEN position.
Figure 11:
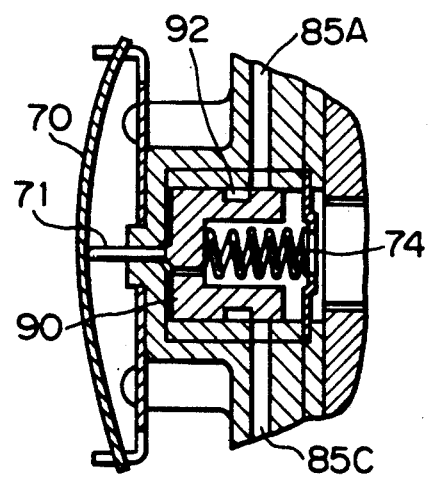
FIG. 11 is a partial sectional view showing a CLOSED position of the valve in FIG. 10.

FIGS. 10 and 11 show a third embodiment of the invention slightly modified from the second embodiment. At a periphery of a valve piston 90, a circumferentially continuous cavity 92 is formed. The retainer pin 78 in FIG. 6 is not needed in this embodiment.

During the OFF condition of the coupling, raked off fluid from one side of the chamber 83 (FIG. 6) passes through the axial port 84A, radial passage 85A, peripheral cavity 90, radial passages 85B, 85D, and axial ports 84B, 84D. Then, it comes back to the chamber 83. Raked off fluid from another side of the chamber 83 passes through the axial port 84C, radial passage 85C, peripheral cavity 90, radial passages 85B, 85D, and axial ports 84B, 84D. Then, it comes back to the chamber 83.

During the circulation flow, the fluid does not meet with a great resistance, so that the rotor 82 can freely rotate within the chamber 83. The driving power from the engine is not transmitted to the housing and the fan.

When ambient temperature goes up, the bimetal 70 bends toward the left direction causing the valve piston 90 to move toward the left direction under the biasing force of the return spring 74. When the valve piston 90 moves to the position shown in FIG. 11, fluid communications between the radial passages 85A, 85C and the peripheral cavity 92 are cut off. Thus, the fluid in the chamber 83 has lost its way to flow out of the chamber. The rotor 82 is nearly fixed in the chamber 83 causing the housing 66 to turn toward the same direction as the rotation of the engine. Thus, the coupling is changed into its ON condition, whereby the fan 9 begins to rotate at a high speed for cooling the engine.

Although a bimetallic coil and bimetallic plate are illustrated and described as the temperature-sensitive element of the present invention, it is also possible to use temperature-sensitive materials such as thermo-wax or a similar compound.

If necessary, the aforementioned transition time can be minimized. In such a case, the fan begins its rotation only when the ambient temperature goes up to a predetermined level.

I claim:

1. A temperature-controlled pneumatic coupling adapted for use in intermittently driving a cooling fan, comprising:
   a drive input shaft;
   a housing rotatably supported on said drive input shaft and being adapted to support the cooling fan, said housing having an actuating chamber defined therein which has a curved wall configuration;
   a rotor mounted on and fixed for rotation with said drive input shaft and being accommodated in said actuating chamber, said rotor having a plurality of radially extending slots defined therein;
   a plurality of radial vanes radially movably accommodated in said plurality of radially extending slots, respectively;
   a plurality of pneumatic fluid passages communicating with said actuating chamber;
   a rotatable substantially cylindrical valve member, having at least one valve passage formed therein, for changing fluid communication between said fluid passages; and
   a temperature sensitive member mounted outside said housing for rotating said substantially cylindrical valve member in response to changes in ambient temperature.

2. A temperature-controlled pneumatic coupling as recited in claim 1, wherein
   said temperature sensitive element comprises a bimetallic coil.

3. A temperature-controlled pneumatic coupling as recited in claim 1, wherein
   said substantially cylindrical valve member and is rotatable between an open position in which pneumatic fluid from said actuating chamber can freely pass through said at least one valve passage and a closed position in which pneumatic fluid from said actuating chamber is prevented from passing through said at least one valve passage; and
   said temperature sensitive element is operable for rotating said substantially cylindrical valve member between said open and closed positions.

4. A temperature-controlled pneumatic coupling as recited in claim 3, wherein
   said plurality of pneumatic fluid passages comprises two pneumatic fluid passages, each in communication with a different portion of said actuating chamber; and
   said at least one valve passage defines a bypass communicating between said two pneumatic fluid passages when said substantially cylindrical valve member is in said open position.

5. A temperature-controlled pneumatic coupling as recited in claim 4, wherein
   said valve passage is defined by a peripheral groove formed at least partially circumferentially about said substantially cylindrical valve member.

6. A temperature-controlled pneumatic coupling as recited in claim 3, wherein said plurality of pneumatic fluid passages comprises two pairs of pneumatic fluid passages, each pneumatic fluid passage being in communication with a different portion of said actuating chamber; and said at least one valve passage comprises a pair of valve passages, each defining a bypass communicating between the two pneumatic fluid passages of each pair of said pneumatic fluid passages when said substantially cylindrical valve member is in said open position.

7. A temperature-controlled pneumatic coupling adapted for use in intermittently driving a cooling fan, comprising:

a drive input shaft;

a housing rotatably supported on said drive input shaft and being adapted to support the cooling fan, said housing having an actuating chamber defined therein which has a curved wall configuration;

a rotor mounted on and fixed for rotation with said drive input shaft and being accommodated in said actuating chamber, said rotor having a plurality of radially extending slots defined therein;

a plurality of radially elongated vanes radially movably accommodated in said plurality of radially extending slots, respectively;

a plurality of pneumatic fluid passages communicating with said actuating chamber;

an axially movable valve member, having at least one valve passage formed therein, for changing fluid communication between said fluid passages; and a temperature sensitive element mounted outside said housing for moving said valve member axially in response to changes in ambient temperature.

8. A temperature-controlled pneumatic coupling as recited in claim 7, wherein said temperature sensitive element comprises a bimetallic plate.

9. A temperature-controlled pneumatic coupling as recited in claim 8, wherein said bimetallic plate is rectangular.

10. A temperature-controlled pneumatic coupling as recited in claim 7, further comprising a return spring means for urging said axially movable valve member toward said temperature sensitive element.

11. A temperature-controlled pneumatic coupling as recited in claim 7, wherein said valve member has and is axially movable between an open position in which pneumatic fluid from said actuating chamber can freely pass through said at least one valve passage and a closed position in which pneumatic fluid from said actuating chamber is prevented from passing through said at least one valve passage; and said temperature sensitive element is operable for axially moving said valve member between said open and closed positions.

12. A temperature-controlled pneumatic coupling as recited in claim 11, wherein said plurality of pneumatic fluid passages comprises two pneumatic fluid passages, each in communication with a different portion of said actuating chamber; and said at least one valve passage defines a bypass communicating between said two pneumatic fluid passages when said substantially cylindrical valve member is in said open position.

13. A temperature-controlled pneumatic coupling as recited in claim 12, wherein said valve member is substantially cylindrical; and said valve passage is defined by a peripheral groove formed at least partially circumferentially about said substantially cylindrical valve member.

14. A temperature-controlled pneumatic coupling as recited in claim 13, wherein said peripheral groove is formed about the entire circumference of said substantially cylindrical valve member.

15. A temperature-controlled pneumatic coupling as recited in claim 11, wherein said plurality of pneumatic fluid passages comprises two pairs of pneumatic fluid passages, each pneumatic fluid passage being in communication with a different portion of said actuating chamber; and said at least one valve passage comprises a pair of valve passages, each defining a bypass communicating between the two pneumatic fluid passages of each pair of said pneumatic fluid passages when said valve member is in said open position.

* * * * *